United States Patent
ter Horst et al.

[11] Patent Number: 5,595,407
[45] Date of Patent: Jan. 21, 1997

[54] ROOF LATCHING DEVICE

[75] Inventors: Gerhardus E. R. ter Horst, Eibergen, Netherlands; Donald J. Moore, Wolston, United Kingdom

[73] Assignee: Jaguar Cars Limited, Allesley, England

[21] Appl. No.: 348,796

[22] Filed: Dec. 2, 1994

[30] Foreign Application Priority Data

Dec. 3, 1993 [NL] Netherlands .......................... 9302107

[51] Int. Cl.⁶ ..................................................... E05C 5/00
[52] U.S. Cl. .......................... 292/5; 292/64; 292/341.16; 292/DIG. 5
[58] Field of Search ................................ 292/DIG. 5, 5, 292/63, 64, 240, 341.16

[56] References Cited

U.S. PATENT DOCUMENTS

| | | | |
|---|---|---|---|
| 2,570,260 | 10/1951 | Milhan | 292/5 |
| 2,570,261 | 10/1951 | Milhan | 292/5 |
| 2,785,914 | 3/1957 | Thomas et al. | |
| 2,831,718 | 4/1958 | Hallek et al. | |
| 3,004,788 | 10/1961 | Dully et al. | 292/5 |
| 5,064,241 | 11/1991 | Ohrle | 292/DIG. 5 X |

FOREIGN PATENT DOCUMENTS

| | | |
|---|---|---|
| 0492006 | 7/1992 | European Pat. Off. . |
| 4111646 | 10/1992 | Germany . |
| 2237061 | 4/1991 | United Kingdom . |

*Primary Examiner*—Rodney M. Lindsey
*Attorney, Agent, or Firm*—Davis and Bujold

[57] ABSTRACT

A roof latching device for latching a convertible folding roof to the header of the windscreen of a vehicle having a pull-to mechanism located centrally of the header, the pull-to mechanism including a hook element for engagement of a formation on the roof when the roof is located close to the header and acting to pull the roof firmly down onto the header, the latching device also including a locking mechanism located in the header on either side of the pull-to mechanism to lock the roof against the header after it has been pulled against the header by the pull-to mechanism.

8 Claims, 5 Drawing Sheets

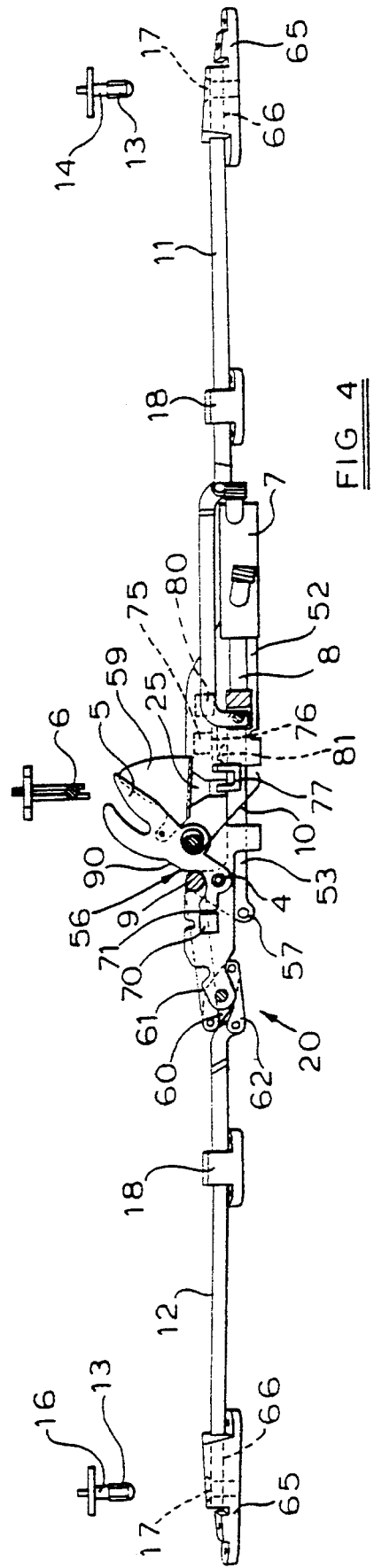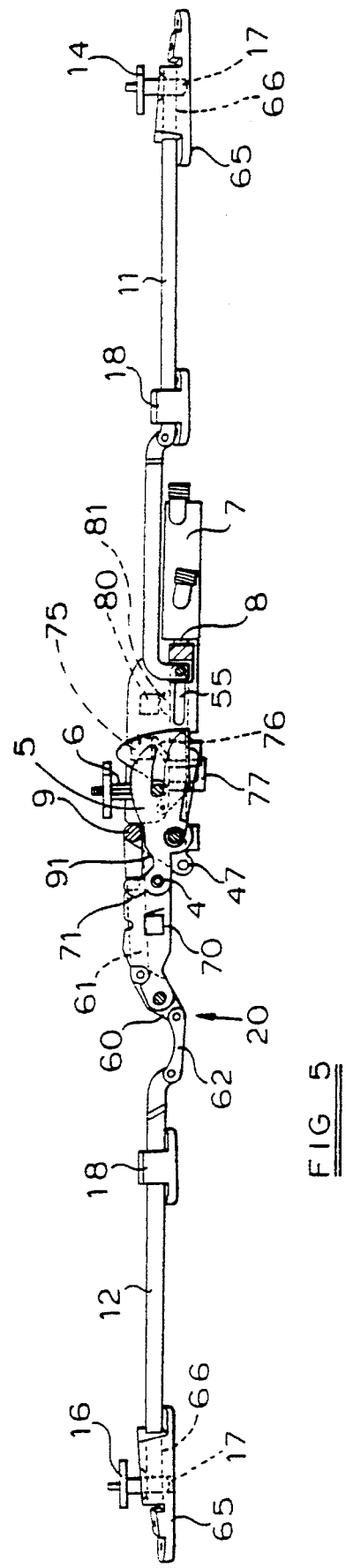

5,595,407

ROOF LATCHING DEVICE

BACKGROUND TO THE INVENTION

The present invention relates to a device for latching a convertible folding roof of a vehicle, to the header of the windscreen of the vehicle, comprising pull-to means located in the header, which pull-to means can grip the roof in a position thereof close to the header and can pull the roof against the header, and drive means for driving the pull-to means.

Such a device is known, for example, from EP 0 492 006, and is used in particular in a vehicle with a convertible folding roof made of fabric. If the rear edge of the roof is immovably connected to the vehicle, when the roof is being closed, irrespective of whether this is carried out manually or by mechanical means, the front edge of the roof will remain a few centimeters away from the header. In order to move the roof against the header the fabric of the roof must be placed under tension. For this purpose, the device known from EP 0 492 006 comprises two pull-to mechanisms, each placed at one side of the vehicle in the header of the windscreen. Each pull-to mechanism comprises a movable hook element which can engage with a matching eye-shaped element disposed on the movable roof and can then pull the roof downwards until the roof rests against the header. The pull-to mechanisms of the known device are designed in such a way that the roof is locked by the pull-to mechanisms themselves in the position pulled against the header. The locking of the roof in this position is essential, since accidental opening of the roof must be avoided in all circumstances.

The known device has the disadvantage that the header has to have undesirably large dimensions for the accommodation of a pull-to mechanism at each end. On the one hand, this is due to the fact that the way in which the pull-to means work requires such pull-to means to have large dimensions. On the other hand, it is important that in the position in which the roof is at a short distance from the header the position of the roof relative to the header can vary within a tolerance range, in particular in the lengthwise direction of the vehicle. This tolerance range is determined by the design of the roof, in particular by the movement mechanism of the roof. The parts of the roof to be gripped by the pull-to means thus must have dimensions which take the tolerance range into account. This means in the case of the device disclosed by EP 0 492 006 that each eye-shaped element has an engagement opening in the lengthwise direction of the vehicle which corresponds to the sum of the thickness of the hook element and the tolerance range. Due to the fact that the pull-to means pull the eye-shaped elements into the header, the header must have undesirably large dimensions at those points.

SUMMARY OF THE INVENTION

The object of the present invention is to eliminate the above mentioned disadvantages and to provide a device of the type mentioned in the preamble which advantageously uses the space available at the top side of a windscreen and is simple in design and reliable.

This object is achieved by a device of the type mentioned in the preamble, which is characterized in that the device comprises pull-to means which can be located centrally in the header, and in that the device also has locking means which can be located in the header, on either side of the pull-to means, the locking means locking the roof after it has been pulled firmly onto the header by the pull-to means. The invention is based on the idea that the central part of the header provides most space—also taking into account the legal standards—for the accommodation of the pull-to means, which require a relatively large amount of space, without detracting from the visibility of the occupants of the vehicle and from the appearance of the vehicle. For, in practice, the rear view mirror is situated near the central part of the header and already impedes the view. The roof can also be reliably locked in the position pulled against the header by the locking means which act according to the invention on either side of the centrally positioned pull-to mechanism. The locking means can be of a simple design, since they need only lock the roof which has already been pulled firmly to against the header.

Another advantage is that when the parts of the roof which interact with the locking means are being designed there is no need to take the tolerance range into account, for these parts need not be gripped, so that their dimensions can be kept small. This means that the header can also be kept correspondingly small at the place where these parts ultimately lie when the roof is closed.

In a preferred embodiment the device comprises positioning means which can be placed centrally in the header, for positioning the roof relative to the header during the pulling. This measure makes advantageous use of the space available in the central part of the header. The positioning function can in this case be carried out either by the pull-to means or by separate positioning means.

The positioning means and the locking means are preferably designed in such a way that during the pulling the roof is positioned relative to the header by the positioning means before the roof goes into engagement with the locking means. This means that the parts of the roof which interact with the locking means are already positioned at the moment when they come into contact with the locking means in the header. The result of this is that the dimensions of the locking means, and thus the dimensions of the header, can be kept as small as possible. This is particularly advantageous for the appearance of the vehicle.

In an advantageous embodiment the locking means are drivably connected to the drive means for the pull-to means. Making use of common drive means for the pull-to means and the locking means ensures that the space required for the device is kept to a minimum. The drive means are in this case preferably placed centrally in the header, so that their position also constitutes the least possible obstacle to the view of occupants and detracts as little as possible from the appearance of the vehicle.

The drive means advantageously comprise a drive cylinder operated by a pressure medium. Great forces can be generated by means of such a cylinder, which is preferably hydraulic, while the cylinder takes up little space. Other drive means, for example an electric motor or solenoid may alternatively be used.

In another advantageous embodiment the locking means comprise a locking bar which is to be accommodated in the header and is movable between an unlocked and a locked position, the locking bar in the locked position interacting on either side of the pull-to means with one or more coupling means disposed on the roof.

In a further advantageous embodiment the locking means comprise two locking bars to be accommodated in the header on either side of the pull-to means, one of the locking bars being connected directly to the drive means, and the other being connected to the drive means with the interposition of reversing means, so that the locking bars can be moved in opposite directions to each other by the drive means between an unlocked position and a locked position, each locking bar in the locked position interacting with one or more coupling means disposed on the roof.

The coupling means preferably comprise projections disposed on the roof, which projections form a positive connection with the locking bar engaging therewith when the roof is in the locked position.

If the header is made curved, in particular in the horizontal plane, with the result that the locking positions of the roof at both ends of the header lie behind the central pull-to means, viewed in the lengthwise direction of the vehicle, it is advantageous for the locking means to be of flexible design, so that the locking means are movable in the curved header. Where the locking means are designed as a locking bar, this means that the bar follows the contour of the top edge of the windscreen, with the result that the header can have the smallest possible dimensions.

The present invention also relates to a vehicle provided with a device according to the invention.

BRIEF DESCRIPTION OF THE DRAWINGS

The invention will be explained in greater detail below with reference to exemplary embodiments of the device according to the invention shown in the drawing, in which:

FIG. 4 shows a sectional elevation of a practical embodiment of the invention, based on the embodiment illustrated in FIGS. 1 and 2, with the latching mechanism open;

FIG. 5 shows a view similar to FIG. 4 with the latching mechanism closed; and

DESCRIPTION OF A PREFERRED EMBODIMENT

Figure 1:
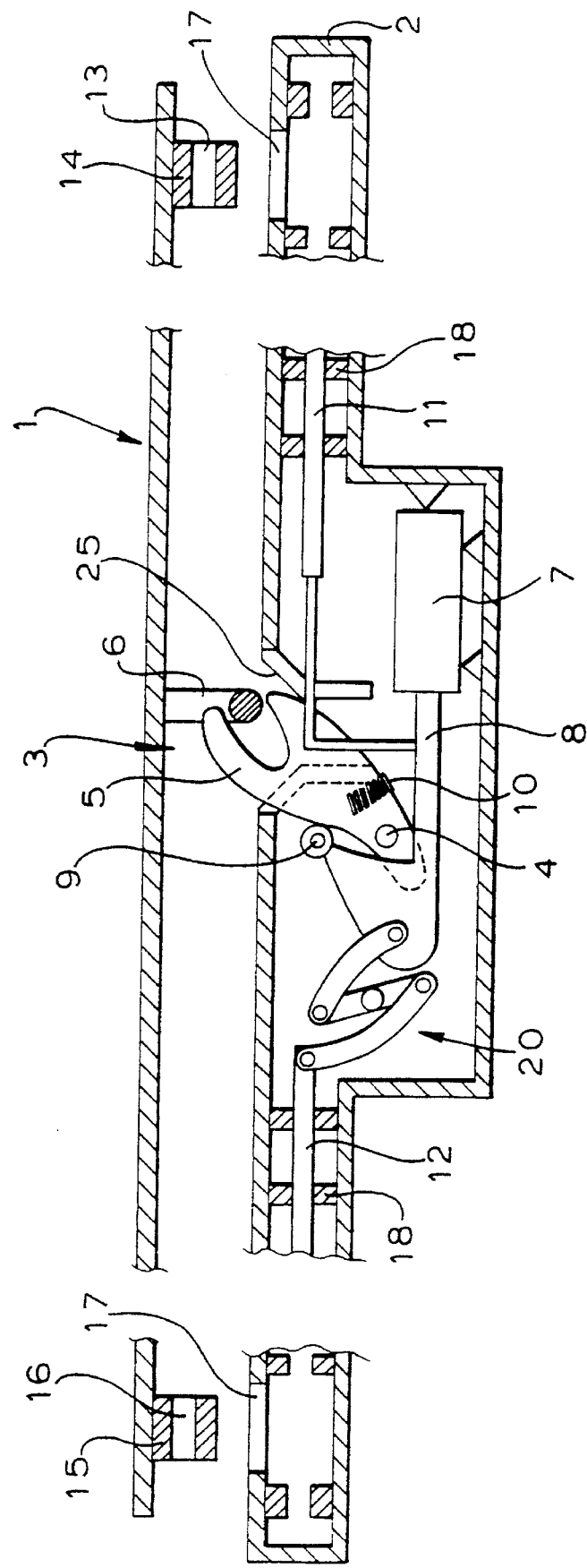
FIG. 1 shows diagrammatically in vertical section a first embodiment of the device according to the invention.

FIG. 1 shows in section the front edge of a convertible folding roof 1 of a vehicle, which roof 1 can be moved automatically by means of the device according to the invention described hereinafter against a header 2 (shown in vertical section in FIG. 1) of a windscreen (not shown) of a vehicle and can be fixed thereto. The very diagrammatically shown device comprises a pull-to mechanism 3 which can move the front edge of the roof 1 out of a position a short distance away from the header 2 against the header 2. The pull-to mechanism 3 comprises a hook element 5 which can be swivelled about a pin 4 which is fixed relative to the header 2. The hook element 5 in the position shown in FIG. 1 projects outwards through an opening in the header 2 and can thereby engage with an engagement eye 6 disposed in the center of the roof 1. The swivelling movement of the hook element 5 is achieved by a hydraulic drive cylinder 7 which is connected to the header 2, and the piston rod 8 of which is immovably connected to a pressure roller 9. When the piston rod 8 moves to the right in FIG. 1, the pressure roller 9 is pushed against the hook element 5, which swivels as a result about the pin 4 against the action of a biassing spring 10. The roof 1 is thus pulled against the header 2 by a single pull-to mechanism 3. The pull-to mechanism 3 and the drive cylinder 7 are placed in the central part of the header 2.

For locking the roof 1 in its pulled-to position against the header 2, locking means are provided in the header and coupling means on the roof. The locking means in this exemplary embodiment comprise two locking bars 11, 12 which are accommodated in the header 2 on either side of the pull-to mechanism 3, in such a way that they are slidably guided by guide blocks 18. The coupling means comprise two projections 14, 16, each fixed near a side of the roof at the front edge of the roof.

In the position of the roof 1 pulled against the header the projections 14, 16 project inwards through openings 17 in the header 2. The locking bar 11 is immovably connected at one end to the piston rod 8 of the hydraulic cylinder 7. Operating the cylinder 7 causes the free end of the locking bar 11 to be moved into a positive locking position in a recess 13 of the projection 14. At the same time, the end of the locking bar 12 is moved into a positive locking position in a recess 15 of the projection 16. Unlike the locking bar 11, the locking bar 12 is not connected directly—but by means of a reversing mechanism 20 for the direction of movement—to the piston rod 8. This causes the locking bar 12 to move to the left when the piston rod 8 is moved to the right.

Figure 2:
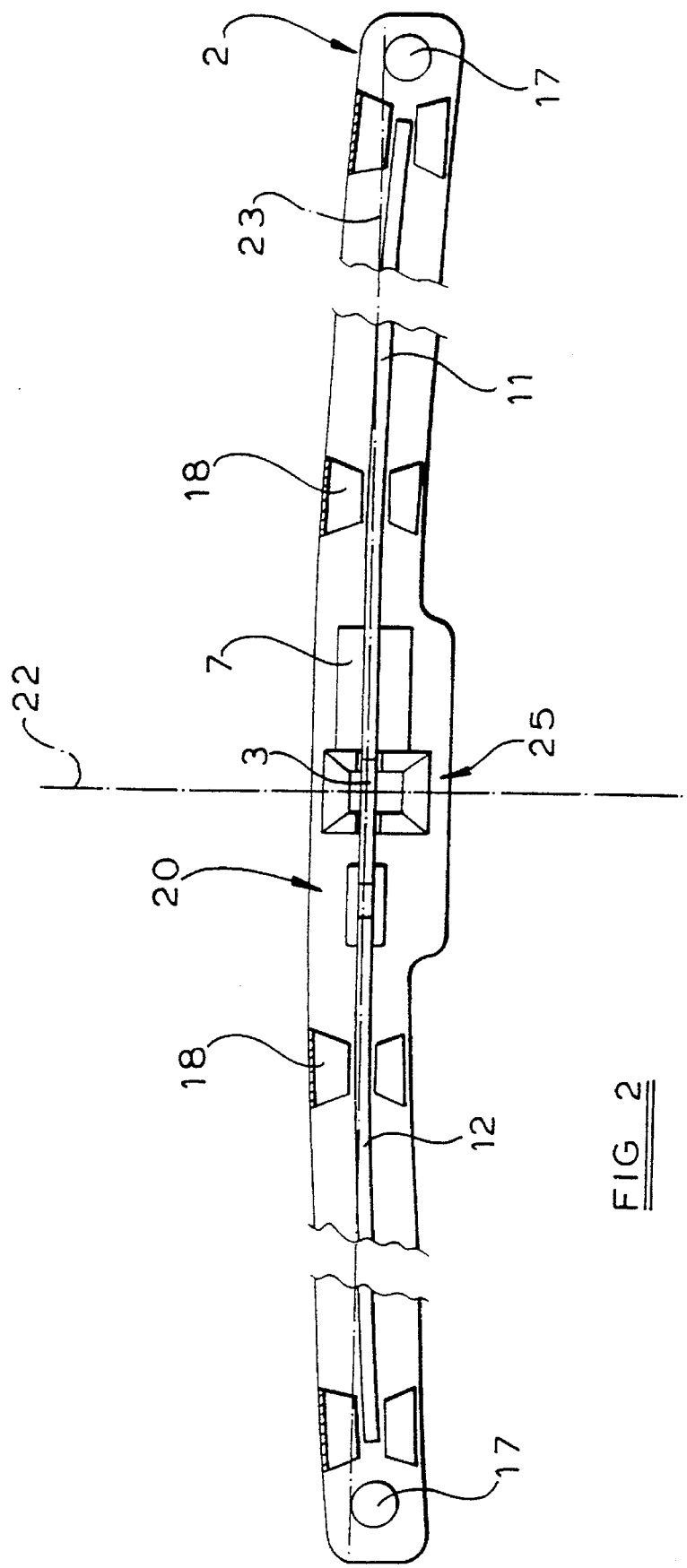
FIG. 2 shows a diagrammatic top view of the device in FIG. 1.

It can be seen from FIG. 2 that the drive cylinder 7 is placed in the header 2 at right angles to the longitudinal axis 22 of the vehicle, in order to drive in a simple manner the movement of the hook element 5 occurring in a plane 23 also lying at right angles to the lengthwise axis. It can also be seen that the header 2 has a curvature in the horizontal plane which normally corresponds to the curvature of the windscreen of the vehicle. The openings 17 for the projections 14, 16 of the roof 1 (not shown in FIG. 2) thus lie behind the drive cylinder 7. According to the invention, the two locking bars 11, 12 are of a flexible design. In this example the locking bars 11, 12 are metal strips which are flexible in the horizontal plane of the header. This means that the ends of the locking bars 11, 12 coupled to drive cylinder 7 can be moved in the plane 23 or parallel thereto, while the free end of the locking bars 11, 12 move at an angle to said plane 23. In another embodiment, which is not shown, a locking bar which is not flexible per se can be connected by way of a flexible element, for example a rubber coupling, to the drive cylinder 7. Another aspect of the invention which can be seen in FIGS. 1 and 2 concerns the positioning function of the device, which ensures that the roof 1 comes to rest in the only correct position against the header. For, in practice, the engagement eye 6 of the roof 1 will lie within a tolerance range relative to the hook element 5, the tolerance in the lengthwise direction of the vehicle being particularly important. For this purpose, the engagement eye 6 has in the lengthwise direction of the vehicle an engagement opening which corresponds to the sum of the thickness of the hook element 5 and the tolerance range. In order to move the roof 1 into the correct position, the header 2 is provided with a centering jaw 25, formed in two halves, for the engagement eye 6. The centering jaw 25 is of such dimensions that the engagement eye 6 can move out of any position within the tolerance range into the centering jaw 25. A gap is present between the halves of the centering jaw 25 for the hook element 5 to pass through. In a feed part thereof, the centering jaw 25 tapers downwards with the result that the engagement eye 6, and thus the roof 1, is guided into the correct position relative to the header 2. The projections 14 and 16 of the roof 1 do not fall into the corresponding holes 17 in the header 2 until the moment that the roof 1 has been positioned relative to the header 2. This is achieved in this exemplary embodiment through a suitable choice of the length of the projections 14 and 16 relative to the length of the engagement eye 6.

The device shown in FIGS. 1 and 2 works as follows. The front edge of the roof 1 is moved into the vicinity of the header 2 by means which are not shown, for example by a mechanism driven by hydraulic cylinders, or manually, the device according to the invention being already in the position shown in FIG. 1. Oil is then supplied under pressure to the cylinder 7 by means which are not shown, so that the piston rod 8 thereof moves to the right in FIG. 1. If the engagement eye 6 of the roof 1 is situated inside the engagement range of the hook element 5, the latter will grip the engagement eye 6, and thus the roof 1, and pull it against the header 2. The feed part of the centering jaw 25 causes the roof be positioned relative to the header 2 during the pulling. At the same time, the locking bars 11, 12 move apart and ultimately project into the recesses 13 and 15 respectively and lock the roof 1 in its closed position. The distance covered by the free ends of the locking bars 11, 12 until they project into the corresponding recess 13, 15 respectively is selected in such a way that this does not occur until the pulling of the roof 1 by the pull-to mechanism 3 has been virtually completed. This can be achieved in a simple manner by determining a suitable length of the locking bars 11, 12.

A major advantage of the device described above is the small amount of space required for the device. The parts of the device with the greatest dimensions, i.e. the pull-to mechanism 3, the centering jaw 25 and the drive cylinder 7, according to the invention are placed in the central part of the header 2. In practice, this is the place where they are least obtrusive for the occupants and for the appearance of the vehicle. Moreover, it is not necessary for the drive cylinder 7 to be placed below the pull-to mechanism 3 in spatial terms, as shown in FIG. 1. The cylinder 7 could also be placed approximately in the plane of the roof next to the pull-to mechanism 3, or in such a way that the drive cylinder 7 and the pull-to mechanism 3 lie behind one another, viewed in the lengthwise direction of the header 2. By making use of locking bars 11, 12, the movement of the piston rod 8 can be transmitted simply and reliably to the places where the locking of the roof 1 is desired. Only minimal space is required for the accommodation of the locking bars 11, 12 in the header 2.

In a variant of the exemplary embodiment of FIGS. 1 and 2, which is not shown, the positioning of the roof can be achieved by centering jaws interacting with the projections 14 and 16 of the roof, instead of by means of the central centering jaw 25. Since, in particular in the lengthwise direction of the vehicle the projections 14 and 16 can be made smaller than the engagement eye 6 in FIG. 1, for the projections 14 and 16 are not engaged, the corresponding centering jaws can also be smaller than the centering jaw 25. With this variant also, it is thus possible to obtain a less bulky header, particularly at the ends, than in the case of the device known from the prior art.

Figure 3:
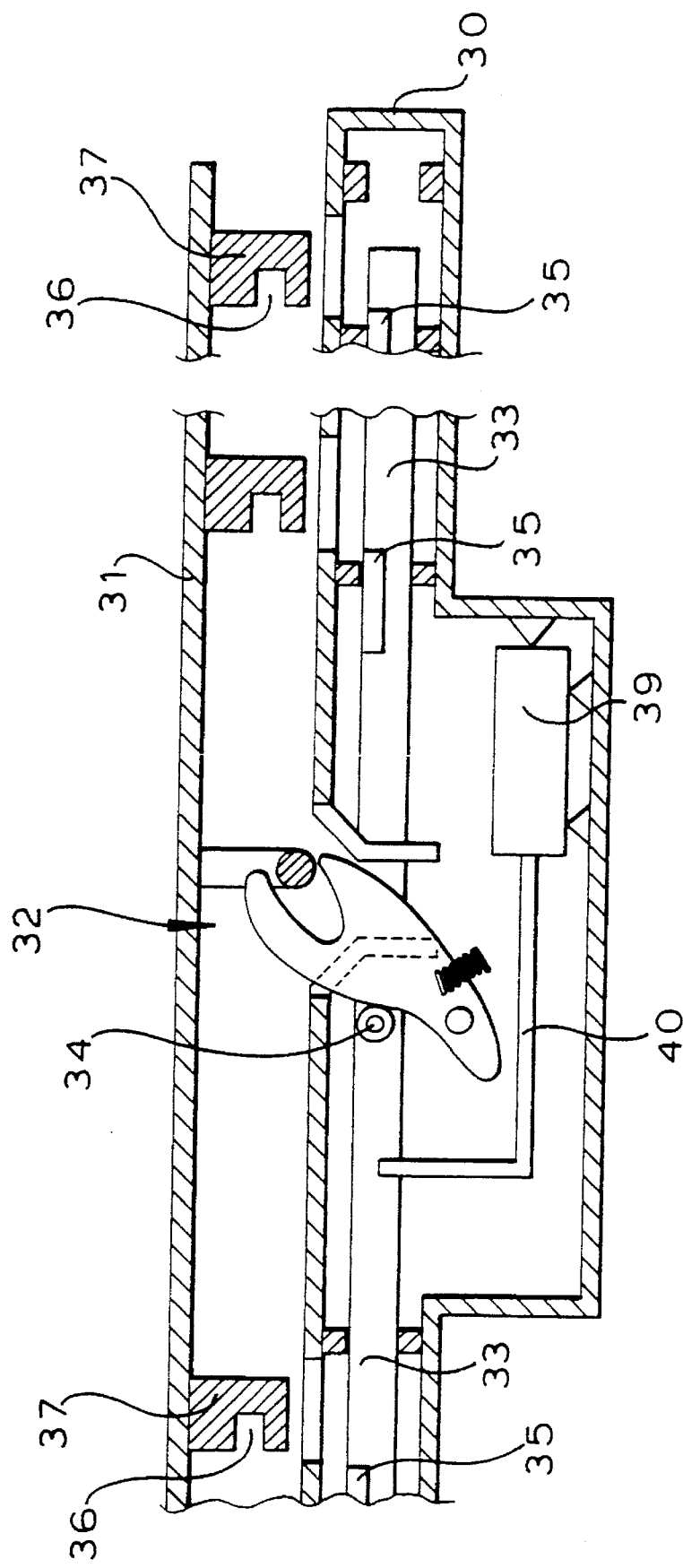
FIG. 3 shows in a view corresponding to FIG. 1 a second embodiment of the device according to the invention.

FIG. 3 shows another exemplary embodiment of the device according to the invention. As in the case of the exemplary embodiment described above, the device comprises a pull-to mechanism 32 placed in the central part of the header 30, for pulling the roof 31 against the header 30, and positioning means (not shown). The pull-to mechanism 32 corresponds essentially to the pull-to mechanism described above and will not be explained in any further detail. The pull-to mechanism 32 is driven by means of a pressure roller 34 disposed on a locking bar 33. The locking bar 33 runs in spatial terms around the pull-to mechanism 32 in the header 30. On either side of the pull-to mechanism 32 the locking bar 33 is provided with locking projections 35. In the position of the roof 31 lying against the header 30, these locking projections 35 can engage in corresponding recesses 36 of projections 37 formed on the roof, and thereby hold the roof in its locked position. The sliding movement of the locking bar 33 in the direction of its longitudinal axis is produced by a hydraulic cylinder 39, the piston rod 40 of which is connected to the locking bar 33.

Figure 6:
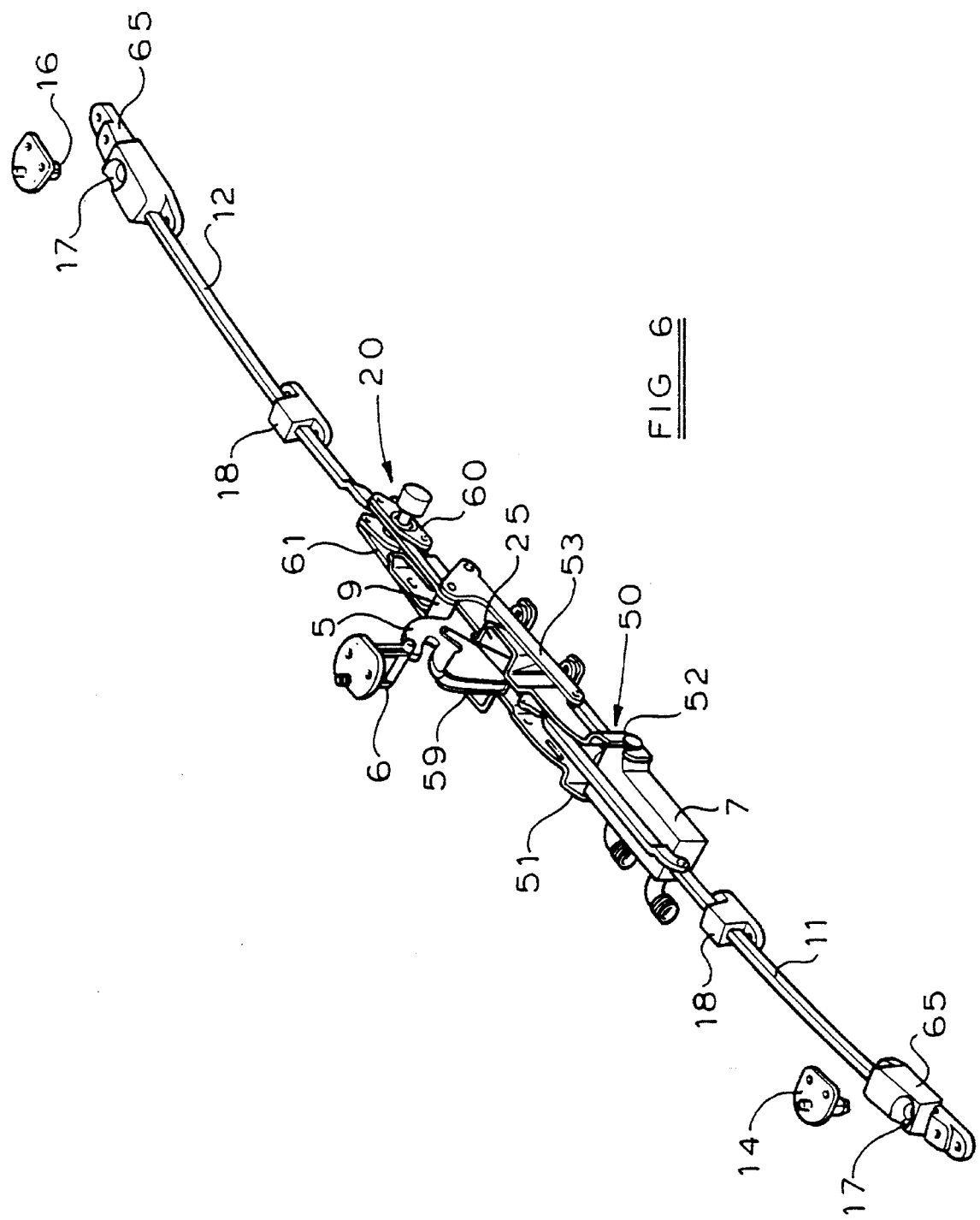
FIG. 6 shows an isometric view of the embodiment illustrated in FIGS. 4 and 5.

In the practical arrangement of the invention illustrated in FIGS. 4 to 6, components corresponding to the components of the embodiment illustrated in FIGS. 1 and 2 are represented by the same reference numerals.

The pull-to mechanism 3 of the device illustrated in FIGS. 4 and 6 is mounted in a cradle 50 which is secured to the upper face of the windscreen header by suitable fastening means and a trim finisher (not shown) is mounted to the windscreen header, to cover the latching device.

The cradle 50 comprises a pair of side members 51, 52 between which the hook element 5 is pivoted on pin 4. The hydraulic drive cylinder 7 is also mounted between the side members 51, 52. A slide 53 is connected to the piston rod 8 by means of a pin 54 which also engages in a pair of elongate slots 55, one in each of the side members 51, 52 of the cradle 50, the pin 54 thereby guiding movement of the end of the slide 53 which is connected to the piston rod 8. The pressure roller 9 is provided at the other end of the slide 53, so that it engages a cam surface 56 on the hook element 5. Further pressure rollers 57 are provided at said other end of the slide 53, for engagement of the lower edges 58 of the side members 51, 52, so that pressure roller 9 will apply downward force on the hook element 5 which will oppose the force applied by a spring 10 which urges the hook element 5 to its open position. The hook element 5 may thus be pivoted from its open to its closed position by causing the hydraulic drive cylinder 7 to retract piston rod 8 so that the slide 53 is moved from a position in which it is displaced fully to the left (as illustrated in FIG. 4) to a position in which it is displaced fully to the right (as illustrated in FIG. 5). Similarly, the hook element 5 may be pivoted from its closed to its open position by moving the slide 53 to the left, from one extreme position to the other.

A guard 59 is pivotally attached to the hook element 5 in order to close the gap between the hook element 5 and the windscreen header, when the hook element 5 is in its open position.

The reversing mechanism 20 comprises a lever 60 which is pivoted centrally between the side members 51 and 52 of cradle 50. One end of lever 60 is pivotally connected to one end of a link 61, the other end of the link 61 being pivotally connected to the slide 53, coaxially of the pressure roller 9. The other end of lever 60 is pivotally connected to a second link 62 the other end of link 62 being pivotally connected to the locking bar 12. The locking bar 12 will thereby be moved to the right when slide 53 moves to the left and to the left when slide 53 moves to the right. The locking bar 11 is connected directly to the slide 53 and piston rod 8 by pin 54.

The projections 14, 16 secured to the roof 1 are in the form of pins with rounded ends, each pin having a diametrical aperture 13 corresponding in cross-section to the cross-section of the locking bars 11, 12.

Blocks 65 mounted on the windscreen header 2 have counter-sunk bores corresponding in cross-section to the pins 14, 16, the bores defining the apertures 17 into which the pins 14, 16 locate as the roof 1 is pulled down by the pull-down mechanism 3. The rounded ends of the pins 14, 16 and counter-sunk portions of the apertures 17, ensure that the pins 14 and 16 align accurately with the apertures 17.

The blocks 65 also have transverse bores 66 corresponding to the cross-section of the locking bars 11 and 12, in which the ends of the locking bars 11 and 12 are located. The bores 66 are disposed diametrically of the bores forming aperture 17, so that when the pins 14 and 16 are fully located in the aperture 17, the locking bars 11 and 12 may be moved to engage the apertures 13 in the pins 14 and 16.

A first limit switch 70 is located adjacent to hook element 5, a formation 71 on the hook element 5 being arranged to engage and actuate the limit switch 70 when the hook element 5 is in its fully opened position.

A second limit switch 75 is mounted adjacent to rocker 76. An arm 77 connected to the rocker 76 extends into the lower portion of the jaw 25, so that when the hook element 5 is in its fully closed position, the arm 77 will be depressed moving the rocker 76 to actuate the limit switch 75.

A third limit switch 80 is adapted to be actuated by a roller 81 which is mounted on the slide 53 and which will actuate the limit switch 80, when the locking bars 11 and 12 are in the fully locked position.

In operation, starting from the fully latched position illustrated in FIG. 5, actuation of the hood control switch will first cause the drive cylinder 7 to be actuated to extend piston rod 8 and drive slide 53 to the left. During the initial movement of slide 53, the pressure roller 9 will move along the flat part 90 of cam surface 56, so that the hook element 5 is maintained in its fully closed position. Movement of the slide 53 during this period will however cause the locking rods 11 and 12 to move disengaging from pins 14 and 16. The pressure roller 9 will then roll down the inclined portion 91 of cam surface 56, permitting the hook element 5 to move to its open position and releasing the roof 1 from the windscreen header 2. When the hook element 5 is in its fully opened position, limit switch 70 is actuated which in turn will energize the mechanism by which the roof 1 may be driven to its lowered position. Once the roof 1 is fully lowered, hydraulic pressure on the drive cylinder 7 is reversed to retract piston rod 8 and move slide 53 from left to right thereby retracting the hook element 5 into the windscreen header 2.

When raising the roof, actuation of the roof control switch will first actuate drive cylinder 7 to move the hook element 5 to its fully opened position. Actuation of limit switch 70 by the hook element 5 will then energize the roof drive mechanism to raise the roof. When the roof is fully raised, as sensed by a limit switch on the roof drive mechanism, the drive cylinder 7 is energized to retract the piston rod 8 and move the hook element 5 to its closed position, the hook element 5 engaging the eye 6 to draw the roof 1 down onto the windscreen header 2. When the hook element 5 is fully closed, the limit switch 75 is actuated and causes the roof drive mechanism to be de-energized. Continued movement of the slide 53 will then cause the locking rods 11 and 12 to engage in the apertures 13 of pins 14 and 16, until limit switch 80 is actuated and the drive cylinder 7 de-energized.

What is claimed is:

1. A roof latching device for latching a convertible folding roof, to a header of a windscreen of a vehicle, the latching device comprising:

pull-to means located centrally in the header, which pull-to means grip the roof in a position thereof close to the header and pull the roof against the header;

drive means for driving the pull-to means;

locking means being located in the header on either side of the pull-to means, in order to lock the roof after the roof has been pulled against the header by means of the pull-to means;

wherein the locking means comprise two locking bars accommodated in the header on either side of the pull-to means, one of the locking bars being connected directly to the drive means, and the other being connected to the drive means with interposition of reversing means, so that the locking bars can be moved in opposite directions to each other by the drive means between an unlocked position and a locked position, and each locking bar in the locked position interacting with at least one coupling means disposed on the vehicle roof.

2. A device according to claim 1, in which the pull-to means includes positioning means for positioning the roof relative to the header as it is pulled down onto the header.

3. A device according to claim 2, in which the roof engages the positioning means and is positioned relative to the header before the roof goes into engagement with the locking means.

4. A device according to claim 1 in which the locking means are drivably connected to the drive means for the pull-to means.

5. A device according to claim 4, in which the drive means are located centrally in the header.

6. A device according to claim 1 in which the drive means comprise a drive cylinder operated by a pressure medium.

7. A device according to claim 1 in which the locking means are of flexible design, so that the locking means are movable in a curved header.

8. A device according to claim 1, in which the coupling means comprise projections disposed on the roof, which projections form a positive connection with one of the two locking bars with which the projections interact when the roof is in the locked position.

* * * * *